United States Patent [19]
Friedl

[11] 3,989,030
[45] Nov. 2, 1976

[54] LIQUID FUEL BURNING HEATER UNIT

[75] Inventor: Reiner Friedl, Starnberg, Germany

[73] Assignee: Webasto-Werk W. Baier KG, Stockdorf near Munich, Germany

[22] Filed: June 23, 1975

[21] Appl. No.: 589,185

Related U.S. Application Data

[63] Continuation-in-part of Ser. No. 531,788, Dec. 11, 1974.

[30] Foreign Application Priority Data

June 22, 1974 Germany............................ 2430046

[52] U.S. Cl. ....................... 126/110 R; 237/12.3 R; 431/263; 431/353
[51] Int. Cl.² ........................................... F24H 3/06
[58] Field of Search ........ 126/110 R, 110 B, 110 C; 431/352, 353, 263; 237/12.3 R

[56] References Cited
UNITED STATES PATENTS

| | | | |
|---|---|---|---|
| 3,144,862 | 8/1964 | Hottenroth et al. ............ | 431/353 X |
| 3,159,201 | 12/1964 | Hottenroth et al. ............ | 431/352 X |
| 3,536,428 | 10/1970 | Beesch .......................... | 237/12.3 R |
| 3,852,024 | 12/1974 | Carlsson ........................ | 431/263 X |
| 3,902,854 | 9/1975 | Brown............................ | 431/263 X |

*Primary Examiner*—Edward G. Favors
*Attorney, Agent, or Firm*—Otto John Munz

[57] ABSTRACT

A liquid fuel burning heater for use in vehicles comprising a burner unit enclosed within a burner housing which in turn is surrounded by the heater housing. A lateral head extending from the heater housing encloses within a hermetically sealed space the connecting end of the ignition plug, a duct leading from this head space either to the atmosphere outside the vehicle, or to the intake side of the burner unit, thereby evacuating leaked exhaust gases.

6 Claims, 1 Drawing Figure

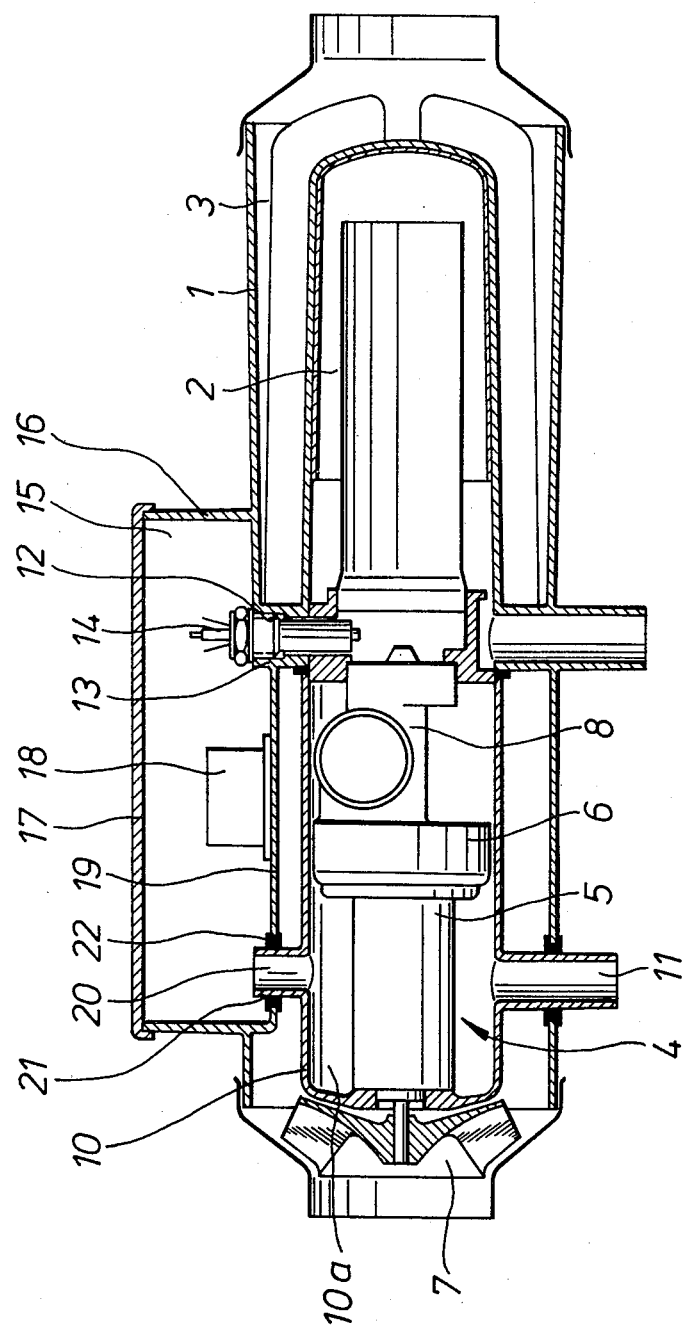

3,989,030

LIQUID FUEL BURNING HEATER UNIT

RELATED APPLICATIONS

This application is a continuation-in-part of application Ser. No. 531,788, filed Dec. 11, 1974.

BACKGROUND OF THE INVENTION

1. Field of the Invention

The present invention relates to liquid fuel burning heaters, and more particularly to compact, self-contained heater units suitable for use in vehicles and which comprise a liquid-fuel-fed burner and a heat exchanger arranged in alignment therewith inside a housing.

2. Description of the Prior Art

Heating units of this kind are normally mounted in the passenger compartment of the vehicle or in some compartment which is open to the passenger compartment. Because of the obsolute necessity of preventing the penetration of exhaust gases into the passenger compartment, very stringent requirements are set for the gas-tightness of all conduits and compartments of a heating unit through which exhaust gases may travel. In the past, it has been largely overlooked that the ignition plug of the heater unit, by virtue of its removability, represented a potential source of exhaust gas leaks.

SUMMARY OF THE INVENTION

Underlying the present invention is, therefore, the objective to devise an improved heater unit, in which the earlier-mentioned potential leak problem is effectively eliminated or neutralized.

The present invention proposes to solve this problem by enclosing the connection end of the ignition plug within a space which is sealed off against the passenger compartment of the vehicle and which communicates with either the combustion air intake side, or with the atmosphere outside the passenger compartment.

The arrangement suggested by the invention thus solves the earlier-mentioned problem by confining any exhaust gases that might have leaked past a poorly seated ignition plug inside a sealed chamber, from where these gases are either exhausted to the open atmosphere, or, according to a preferred embodiment of the invention, are joined with the combustion air, being sucked out of the sealed chamber as the result of the negative pressure on the intake side of the burner. Any leaked gases are thus returned to the combustion chamber, their penetration into the passenger compartment of the vehicle being thereby effectively prevented.

In a preferred embodiment of the invention, it is further suggested that the above results can be achieved by arranging on the main housing of the heater a laterally extending head, enclosing within its cavity the control accessories of the heater unit as well as the connection end of the ignition plug. This head space is hermetically sealed against the outside by means of a removable cover. A duct in the housing wall provides a passage between the aforementioned head space and the burner unit, to the intake side of its combustion air blower.

According to a further advantageous feature of the invention, the burner unit is enclosed within a burner housing which is mounted inside the heater housing and radially spaced therefrom to provide a flow space for the heat exchanger air intake, the duct between the head space and the intake side of the burner unit extending sealingly across the gap between the two housings. The duct is preferably a tubular extension of the burner housing, reaching a short distance into the lateral head of the heater housing. A suitable rubber gasket assures a tight connection, while permitting the insertion and removal of the burner unit as a result of its flexibility.

BRIEF DESCRIPTION OF THE DRAWING

Further special features and advantages of the invention will become apparent from the description following below, when taken together with the accompanying drawing which illustrates, by way of example, a preferred embodiment of the invention, represented as follows:

The sole FIGURE of the drawing shows, in a longitudinal cross section, a liquid fuel burning heater unit embodying the present invention.

DESCRIPTION OF THE PREFERRED EMBODIMENT

Referring to the drawing, there is illustrated a liquid fuel burning heater unit of compact design, having a heater housing 1 enclosing therein a tubular combustion chamber 2 and a heat exchanger 3 surrounding the latter. The burner unit 4, consisting essentially of an electric motor 5, a combustion air blower 6, a fan 7, and a fuel pump 8 with an atomizer nozzle, is mounted in axial alignment with the combustion chamber, so as to discharge a mixture of fuel and combustion air into the latter, past the tip of an ignition plug 12. The aforementioned component parts of the burner unit 4 are enclosed within a generally cylindrical burner housing 10, forming a subassembly which is insertable and removable from the heater housing 1. A generally annular gap separates the burner housing 10 from the inner wall of the heater housing 1, cold air passing through said gap to the heat exchanger portion of the heater unit, under the action of the fan 7. An intake duct 11 for combustion air, extending radially from the burner housing 10, reaches across the gap between the two housings to the outside of the heater unit.

The lateral head 16, defining a head space 15 between its walls and a removable hermetically closable cover 17, extends over a portion of the heater housing, so as to enclose within its sealed head space 15 a seat 13 for the ignition plug 12 whose connecting end 14 extends into the sealed head space 15. Inside the same head space are preferably also arranged the controls for the heater unit, indicated at 18.

A second connecting duct 20, extending from the burner housing 10 across the surrounding air gap and into the head space 15, thus links the latter with the intake side of the combustion air blower 6. This connection assures that any exhaust gases that might escape into the head space 15, as a result of a poorly seated ignition plug 12, will be drawn back into the burner unit, via a connecting duct 20, under the negative pressure created by the combustion air blower 6. A flexible rubber gasket 22, seated in the aperture 21 of the housing 21, sealingly surrounds the connecting duct 20 where it reaches into the head space 15.

As an alternative to the recirculation of the leaked exhaust gases into the burner unit 4, the space 15 of the lateral head 16 may also be connected to the open atmosphere outside the vehicle by a suitable conduit (not shown) which extends from the head space 15 to the open air. The present invention may also be advantageously used in connection with liquid fuel burning heater units that are adapted for the heating of water, instead of air as in the embodiment just described.

It should be understood, of course, that the foregoing disclosure describes only a preferred embodiment of the invention and that it is intended to cover all changes and modifications of this example of the invention which fall within the scope of the apended claims.

I claim the following:

1. A liquid fuel burning heater, suitable for use in a vehicle, comprising in combination:
  a heater housing;
  a burner unit arranged inside the heater housing and including a burner head, a combustion air blower, means for feeding fuel to the burner head, and an ignition plug extending accessibly from outside the burner housing to the vicinity of the burner head; and
  a combustion chamber arranged inside the heater housing and located adjacent to the burner head, a heat exchanger being associated with the combustion chamber, for the transfer of combustion heat to a heat carrier medium flowing through the heat exchanger; and wherein
  the ignition plug has an accessible outer extremity which is hermetically enclosed within a head space defined by lateral head walls of the heater housing and by a removable cover.

2. A heater as defined in claim 1, further comprising a duct leading from the head space of the burner housing to the open atmosphere, a distance away from the location of the heater unit.

3. A heater as defined in claim 1, further comprising a connecting duct extending from the head space of the burner housing to the intake side of the combustion air blower of the burner unit.

4. A heater as defined in claim 3, wherein
  the burner unit is enclosed within a burner housing, said housing, in turn, being surrounded by the heater housing, with a substantially annular air flow gap between the two housings; and
  the connecting duct extends from the burner housing, as an integral part thereof, across said annular gap and into the head space.

5. A heater as defined in claim 4, wherein
  the connecting duct is surrounded by a flexible sealing gasket, seated in an aperture of the heater housing through which the duct extends into the head space.

6. A heater as defined in claim 1, further comprising heater controls which are likewise enclosed within said head space of the heater housing.

* * * * *